United States Patent
Angara et al.

(10) Patent No.: US 11,223,636 B1
(45) Date of Patent: Jan. 11, 2022

(54) SYSTEMS AND METHODS FOR PASSWORD BREACH MONITORING AND NOTIFICATION

(71) Applicant: Symantec Corporation, Mountain View, CA (US)

(72) Inventors: SriHarsha Angara, Fremont, CA (US); Adam Stiles, Altadena, CA (US); Mahesh Kamsala, Cypress, CA (US)

(73) Assignee: NortonLifeLock Inc., Tempe, AZ (US)

( * ) Notice: Subject to any disclaimer, the term of this patent is extended or adjusted under 35 U.S.C. 154(b) by 204 days.

(21) Appl. No.: 16/725,192

(22) Filed: Dec. 23, 2019

(51) Int. Cl.
*H04L 29/06* (2006.01)
*G06F 21/46* (2013.01)
*H04L 9/32* (2006.01)

(52) U.S. Cl.
CPC .......... *H04L 63/1416* (2013.01); *G06F 21/46* (2013.01); *H04L 9/3247* (2013.01); *H04L 63/083* (2013.01)

(58) Field of Classification Search
CPC . H04L 63/1416; H04L 9/3247; H04L 63/083; G06F 21/46
See application file for complete search history.

(56) References Cited

U.S. PATENT DOCUMENTS 9,379,896 B1 * 6/2016 Altman ................. H04L 9/3236
10,540,493 B1 * 1/2020 Kras ........................ G09B 9/00
2017/0346797 A1 * 11/2017 Yedidi ..................... H04L 63/14
2020/0137105 A1 * 4/2020 Endler .................. H04L 63/083
2021/0006573 A1 * 1/2021 Britt ....................... G06F 21/602

OTHER PUBLICATIONS

Thomas, Kurt, et al. "Protecting accounts from credential stuffing with password breach alerting." 28th {USENIX} Security Symposium ({USENIX} Security 19). 2019. (Year: 2019).*

* cited by examiner

*Primary Examiner* — Joseph P Hirl
*Assistant Examiner* — Ka Shan Choy
(74) *Attorney, Agent, or Firm* — FisherBroyles, LLP (57) ABSTRACT

The disclosed computer-implemented method for password breach monitoring and notification may include (i) detecting a set of authentication credentials for a user, (ii) generating a one-way hash for a password associated with the authentication credentials, (iii) selecting a hash prefix including a subset of data in the hash, (iv) sending the hash prefix to a backend service for matching with a set of hash suffixes associated with known compromised passwords, (v) determining that a breach has occurred based on the password associated with the authentication credentials being compromised when the hash prefix matches a hash suffix in the set of hash suffixes, and (vi) performing a security action that protects against an additional breach associated with the compromised password. Various other methods, systems, and computer-readable media are also disclosed.

20 Claims, 7 Drawing Sheets

SYSTEMS AND METHODS FOR PASSWORD BREACH MONITORING AND NOTIFICATION

BACKGROUND

Data breaches often pose a significant problem for users of enterprise computing systems when attackers obtain user credentials (e.g., passwords) for accessing and leaking stored personally identifiable information (PII) without authorization. As a means of protecting against data breaches, enterprises may utilize security software that includes a password breach detection service for determining when a user's authentication credentials have been utilized in a data breach by a third party. In traditional password breach detection services, a continuously-updated collection of breached credentials may be maintained in a database against which all password-based login attempts are checked. Any password matches may result in corresponding login attempts being blocked in real-time.

Many traditional password breach detection services often require receiving a full hash of user authentication credentials (e.g., a username/password combination) for performing breach monitoring and notification. However, these requirements may pose a security vulnerability as an attacker can utilize various methods to break the hash and thereby obtain a user's full authentication credentials (e.g., from a password data storage associated with providing breach detection services) resulting in user privacy concerns. Other traditional password breach detection services provide the capability for receiving partial password hashes, however these services are often limited in that they do not provide monitoring and notifications to users of data breaches.

SUMMARY

As will be described in greater detail below, the present disclosure describes various systems and methods for password breach monitoring and notification.

In one example, a method for password breach monitoring and notification may include (i) detecting a set of authentication credentials for a user, (ii) generating a one-way hash for a password associated with the authentication credentials, (iii) selecting a hash prefix including a subset of data in the hash, (iv) sending the hash prefix to a backend service for matching with a set of hash suffixes associated with known compromised passwords, (v) determining that a breach has occurred based on the password associated with the authentication credentials being compromised when the hash prefix matches a hash suffix in the set of hash suffixes, and (vi) performing a security action that protects against an additional breach associated with the compromised password.

In some examples, the authentication credentials may include a username/password combination. In some embodiments, sending the hash prefix to the backend service may include sending the subset of the hash data, a notification token, and a version number associated with the hash prefix to the backend service. In some examples, determining that a breach has occurred may include (i) receiving, from the backend service, a push notification including a bloom filter data file representing a set of signatures including the set of hash suffixes and (ii) determining that the hash prefix matches the hash suffix when the hash prefix matches a signature from the set of signatures. In other embodiments, determining that a breach has occurred may include (i) receiving, from the backend service, a data container containing the set of hash suffixes and version number for the data container and (ii) determining that the hash prefix matches the hash suffix when the hash prefix matches a hash suffix in the data container containing the set of hash suffixes. In some examples, the method may further include verifying, with the backend service, that the match of the hash prefix with the hash suffix is not a false positive.

In some embodiments performing the security action may include (i) sending a breach alert notification to the user and (ii) generating a request for the user to change the password associated with the authentication credentials to a new password. In some embodiments, the security action may further include (i) generating a new hash prefix for the new password and (ii) registering the new hash prefix with the backend service.

In one embodiment, a system for password breach monitoring and notification may include at least one physical processor and physical memory that includes a set of modules and computer-executable instructions that, when executed by the physical processor, cause the physical processor to (i) detect, by a detection module, authentication credentials for a user, (ii) generate, by a hash module, a one-way hash for a password associated with the authentication credentials, (iii) select, by a selection module, a hash prefix comprising a subset of data in the hash, (iv) send, by a sending module, the hash prefix to a backend service for matching with a set of hash suffixes associated with known compromised passwords, (v) determine, a determining module, that a breach has occurred based on the password associated with the authentication credentials being compromised when the hash prefix matches a hash suffix in the set of hash suffixes, and (v) perform, by a security module, a security action that protects against an additional breach associated with the compromised password.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect authentication credentials for a user, (ii) generate a one-way hash for a password associated with the authentication credentials, (iii) select a hash prefix comprising a subset of data in the hash, (iv) send the hash prefix to a backend service for matching with a set of hash suffixes associated with known compromised passwords, (v) determine that a breach has occurred based on the password associated with the authentication credentials being compromised when the hash prefix matches a hash suffix in the set of hash suffixes, (vi) and perform a security action that protects against an additional breach associated with the compromised password.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for password breach monitoring and notification. As will be described in greater detail below, the systems and methods described herein may select a small prefix from a one-way hash generated from the password of a user's authentication credentials (e.g., a username/password combination) and send the prefix to a backend service for matching with a set of hash suffixes associated with compromised passwords. By utilizing the hash prefix in this way, the systems and methods herein may enable client devices to determine compromised passwords and alert affected users of a breach (e.g., so that the users may change their password to prevent future breaches) without sending full hashes of user passwords to a breach monitoring and notification service from client computing devices.

In addition, the systems and methods described herein may improve computing device security by increasing the effectiveness of password breach monitoring and notification services through the use of password hash prefixes, thereby alleviating potential user privacy concerns associated with the sharing of full password hashes that may be subject to discovery by malicious third parties by virtue of the full hashes being stored on remote computing devices.

Figure 1:
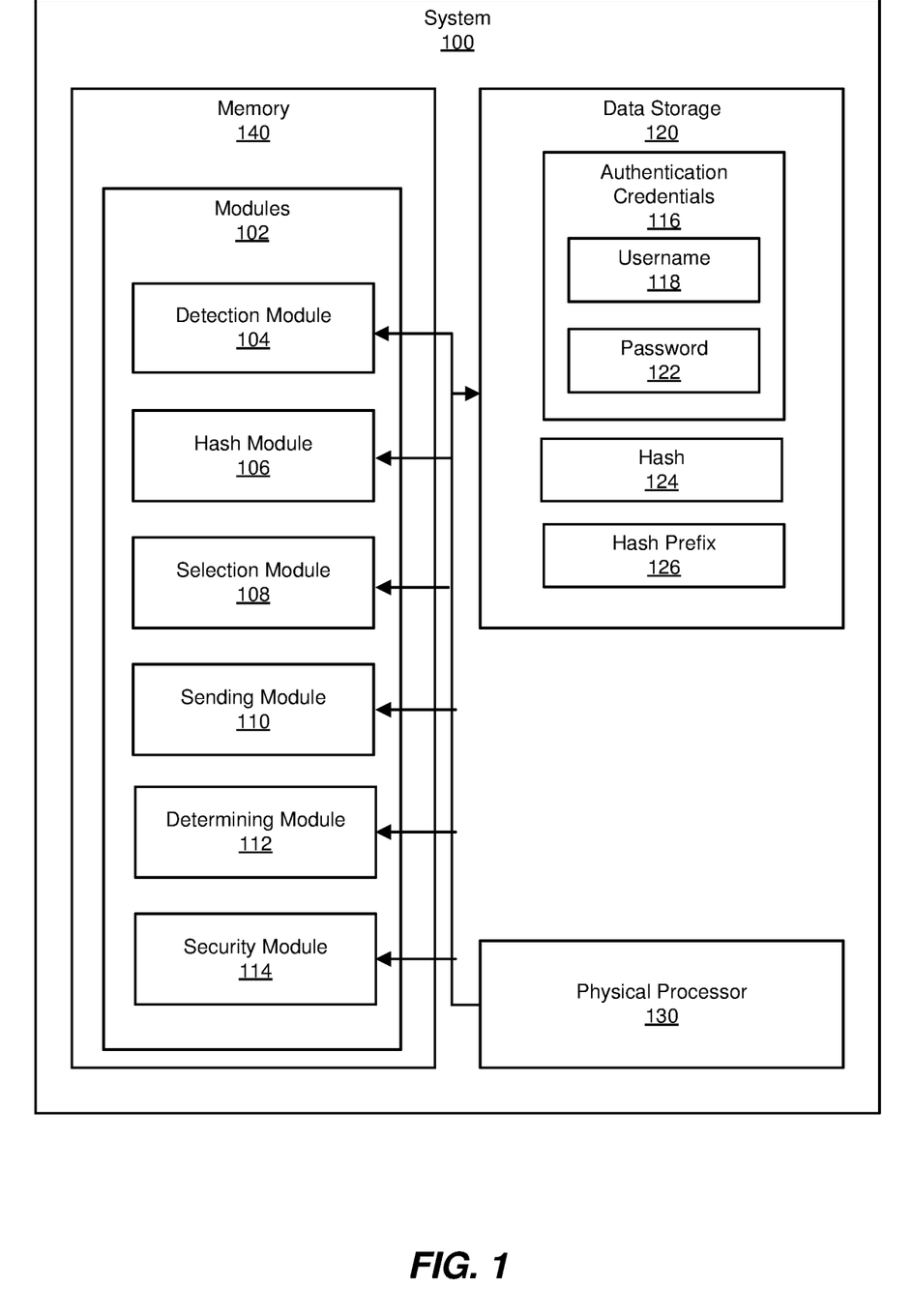
FIG. 1 is a block diagram of an example system for password breach monitoring and notification.
Figure 2:
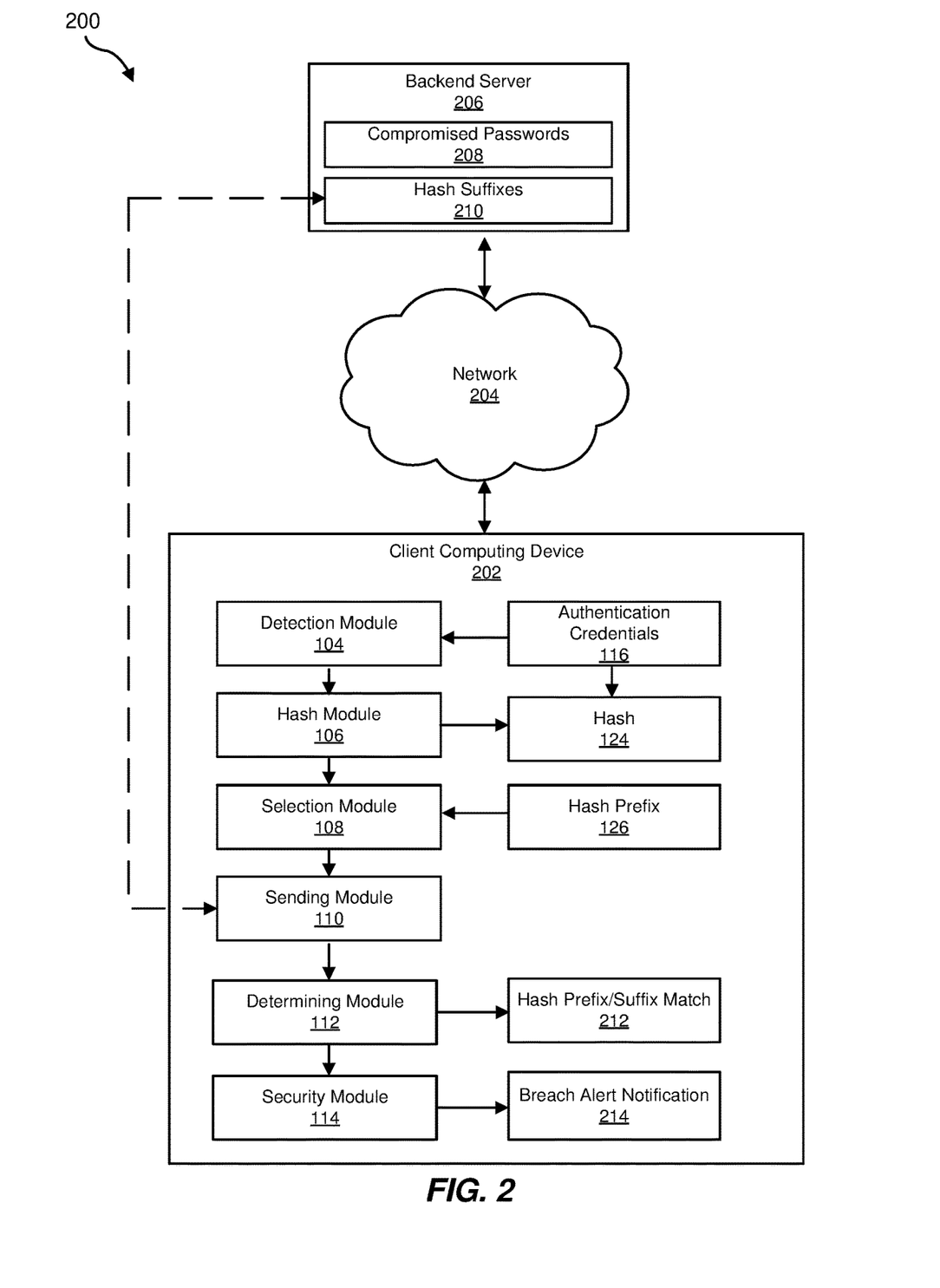
FIG. 2 is a block diagram of an additional example system for password breach monitoring and notification.

The following will provide, with reference to FIGS. 1-2, detailed descriptions of example systems for password breach monitoring and notification. Detailed descriptions of corresponding computer-implemented methods will also be provided in connection with FIG. 3. In addition, a detailed description of an example hash prefix and a data container for storing hash suffixes will also be provided in connection with FIG. 4. In addition, a detailed description of an example breach alert notification, including a bloom filter data file, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for password breach monitoring and notification. As illustrated in this figure, example system 100 may include one or more modules 102 for performing one or more tasks. For example, and as will be explained in greater detail below, example system 100 may include a detection module 104 that detects authentication credentials 116 for a user. Example system 100 may additionally include a hash module 106 that generates a one-way hash 124 (hereinafter referred to as "hash 124") for a password 122 associated with authentication credentials 116. Example system 100 may also include a selection module 108 that selects a hash prefix 126. Hash prefix 126 may include a subset of data in hash 124. Example system 100 may additionally include a sending module 110 that sends hash prefix 126 to a backend service for matching with a set of hash suffixes associated with known compromised passwords. Example system 100 may additionally include a determining module 112 that determines the occurrence of a breach based on password 122 being compromised when hash prefix 126 matches a hash suffix in the set of hash suffixes. Example system 100 may additionally include a security module 114 that performs a security action to protect against additional preaches associated with the compromised password. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client computing device 202 and/or backend server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate password breach monitoring and notification. Examples of physical processor 130 include, without limitation, microprocessors, microcontrollers, Central Processing Units (CPUs), Field-Programmable Gate Arrays (FP- GAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store authentication credentials for a user including a username 118 and password 122. Data storage 120 may also store hash 124 and hash prefix 126.

Example system 100 in FIG. 1 may be implemented in a variety of ways. For example, all or a portion of example system 100 may represent portions of example system 200 in FIG. 2. As shown in FIG. 2, system 200 may include a client computing device 202 in communication with a backend server 206 via a network 204. In one example, all or a portion of the functionality of modules 102 may be performed by client computing device 202, backend server 206, and/or any other suitable computing system. As will be described in greater detail below, one or more of modules 102 from FIG. 1 may, when executed by at least one processor of client computing device 202 and/or backend server 206, enable client computing device 202 and/or backend server 206 to perform password breach monitoring and notification.

For example, detection module 104 may detect authentication credentials 116 on client computing device 202. Next, hash module 106 may generate hash 124 from a password (e.g., password 122) in authentication credentials 116. Then, selection module 108 may select, from data comprising hash 124, a subset of the data as hash prefix 126. Next, sending module 110 may send hash prefix 126 to backend server 206 (e.g., a backend service) for matching with hash suffixes 210 that are associated with known compromised passwords 208. Then, determining module 112 may determine that a breach has occurred based on a hash prefix/suffix match 212 of hash prefix 126 and a hash suffix 210. Finally, security module 114 may generate a breach alert notification 214 to a user associated with a compromised password 208 to protect against additional breaches.

Client computing device 202 generally represents any type or form of computing device capable of reading computer-executable instructions. In some examples, client computing device 202 may be an endpoint device (e.g., a mobile computing device) running client-side security software including password breach monitoring and notification. Additional examples of client computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Backend server 206 generally represents any type or form of computing device that is capable of reading and/or executing computer-readable instructions. In some examples, backend server 206 may be an application and/or database server configured to perform various services (e.g., backend services) associated with password breach monitoring and notification. Additional examples of backend server 206 include, without limitation, security servers, application servers, web servers, storage servers, and/or database servers configured to run certain software applications and/or provide various security, web, storage, and/or database services. Although illustrated as a single entity in FIG. 2, backend server 206 may include and/or represent a plurality of servers that work and/or operate in conjunction with one another.

Network 204 generally represents any medium or architecture capable of facilitating communication or data transfer. In one example, network 204 may facilitate communication between client computing device 202 and backend server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
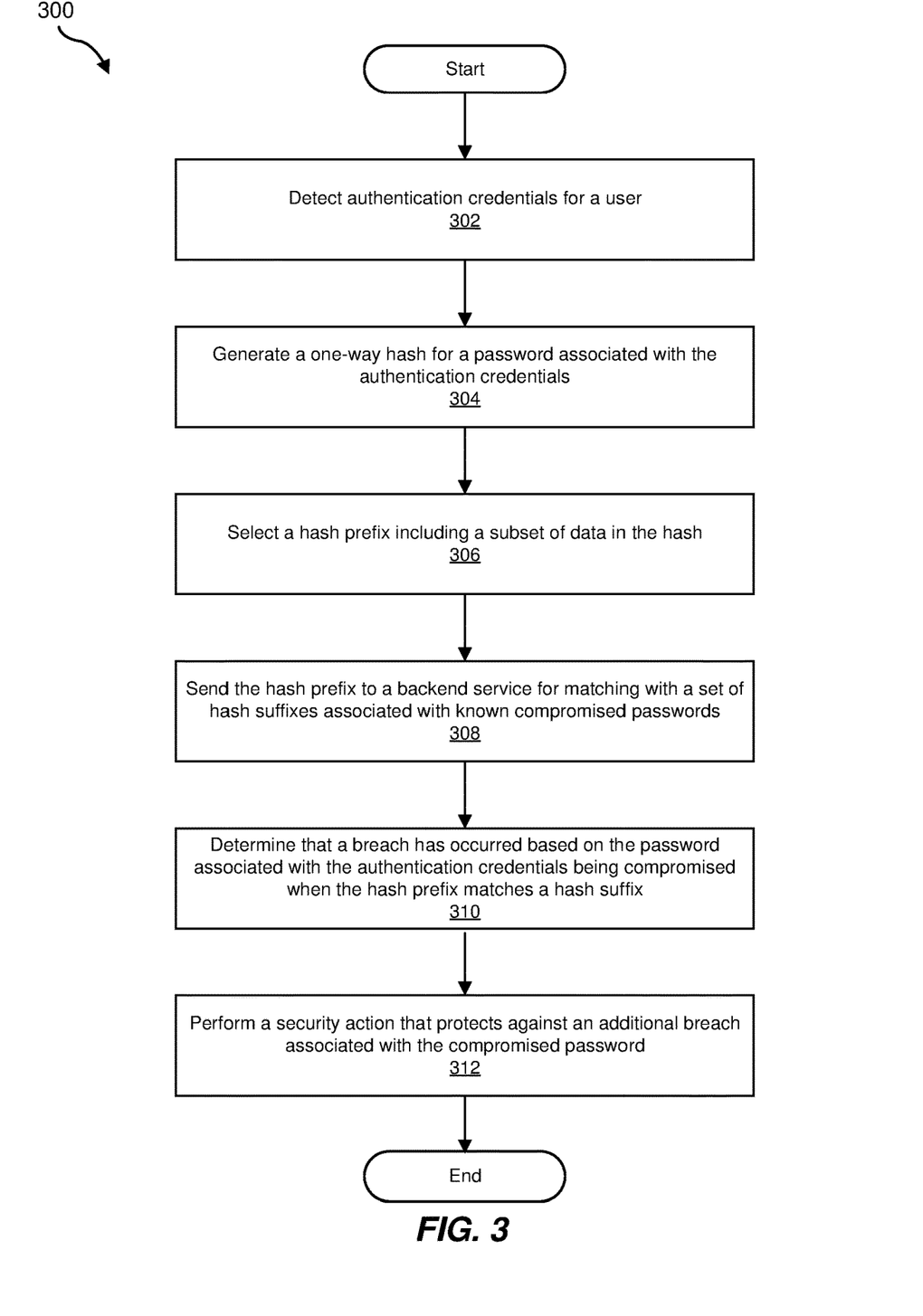
FIG. 3 is a flow diagram of an example method for password breach monitoring and notification.

FIG. 3 is a flow diagram of an example computer-implemented method 300 for password breach monitoring and notification. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect authentication credentials for a user. For example, detection module 104 may, as part of client computing device 202 in FIG. 2, detect authentication credentials 116, which may include username 118 and password 122) for a user of client computing device 202.

Detection module 104 may detect authentication credentials 116 in a variety of ways. In some embodiments, detection module 104 may be integrated into a client software development kit (SDK) provided for client computing device 202 by a password breach and notification service. In one example, detection module 104 may detect authentication credentials 116 by utilizing the client SDK to request authentication credentials 116 which may be stored on client computing device 202 or on another computing device (not shown).

At step 304, one or more of the systems described herein may generate a one-way hash for a password associated with the authentication credentials detected at step 302. For example, hash module 106 may, as part of client computing device 202 in FIG. 2, generate hash 124 for password 122 in authentication credentials 116.

Hash module 106 may generate hash 124 in a variety of ways. In some embodiments, hash module 106 may generate hash 124 by performing a one-way hash of password 122 utilizing any of a variety of cryptographic hash functions including, without limitation, the Secure Hash Algorithm 1 (SHA-1), the SHA-2 family (e.g., SHA-256), and the Argon2 key derivation function.

At step 306, one or more of the systems described herein may select a hash prefix including a subset of data in the hash generated at step 304. For example, selection module 108 may, as part of client computing device 202 in FIG. 2, select hash prefix 126 from hash 124 as will be described in greater detail below.

The term "hash prefix," as used herein, generally refers to a small number of units of data storage capacity (e.g., bits and bytes) relative to the size of a number of units of data storage capacity for a password hash from which the prefix is selected. For example, for a 160-bit password hash, 20 bits may be selected for the hash prefix.

Selection module 108 may select hash prefix 126 in a variety of ways. In some embodiments, selection module 108 may utilize a client SDK (e.g., the client SDK discussed above at step 302) to pick a small prefix (i.e., relative to the size of hash 124). For example, selection module 108 may utilize the client SDK to pick a 3-4 byte prefix from a 24 byte hash.

At step 308, one or more of the systems described herein may send the hash prefix selected at step 306 to a backend service for matching with a set of hash suffixes associated with known compromised passwords. For example, sending module 110 may, as part of client computing device 202 in FIG. 2, send hash prefix 126 to backend server 206 for matching with hash suffixes 210 associated with compromised passwords 208.

The term "hash suffix," as used herein, generally refers to a number of units of data storage capacity (e.g., bits and bytes) corresponding to (i.e., matching) a hash prefix for a password hash. In some examples, a single hash prefix may match several hash suffixes which may be stored in several data containers (or buckets) associated with compromised password data.

The term "compromised password," as used herein, generally refers to any stored authentication data that has been leaked to an unauthorized third party. For example, an attacker may utilize various forms of malware to obtain usernames and passwords for computing device users employed by an enterprise as a means of stealing personal identifiable information for illicit purposes.

Figure 4:
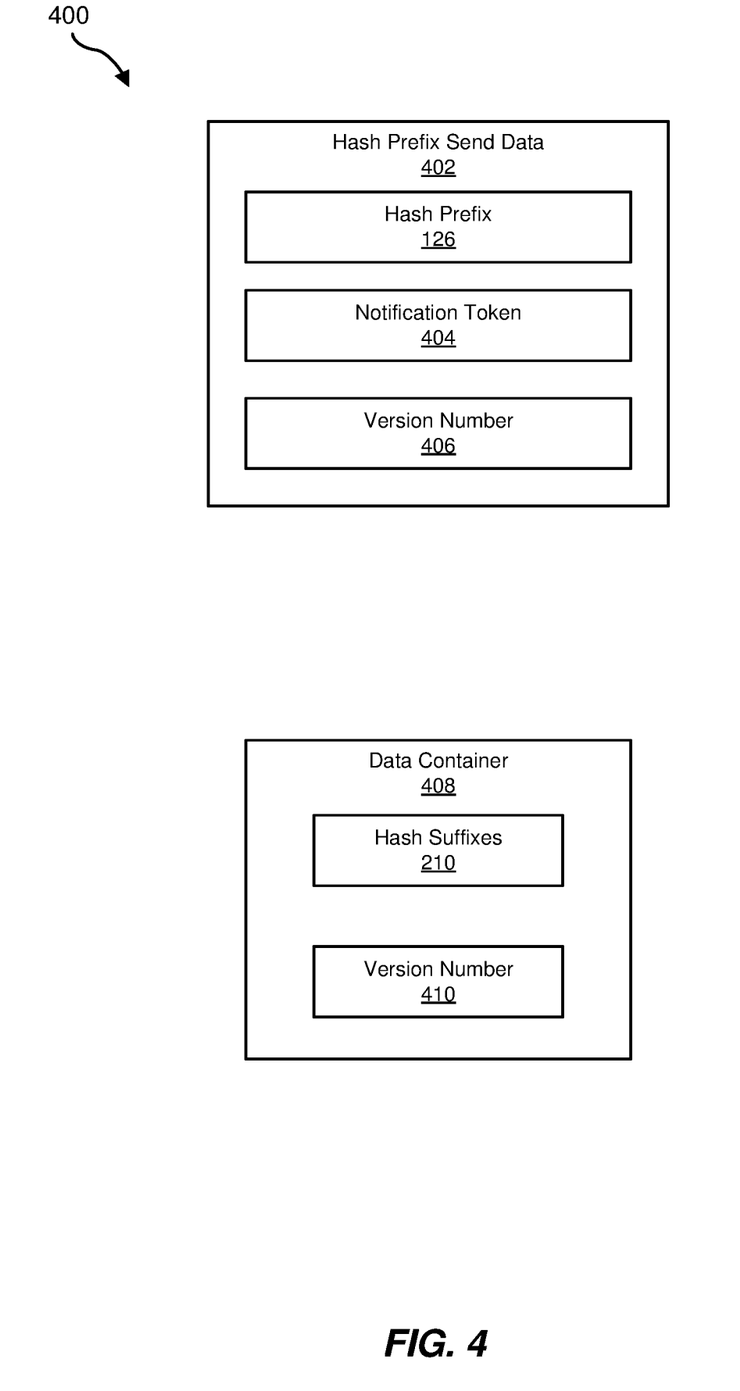
FIG. 4 is a block diagram of an example hash prefix and a data container for storing hash suffixes in an example system for password breach monitoring and notification.
Figure 5:
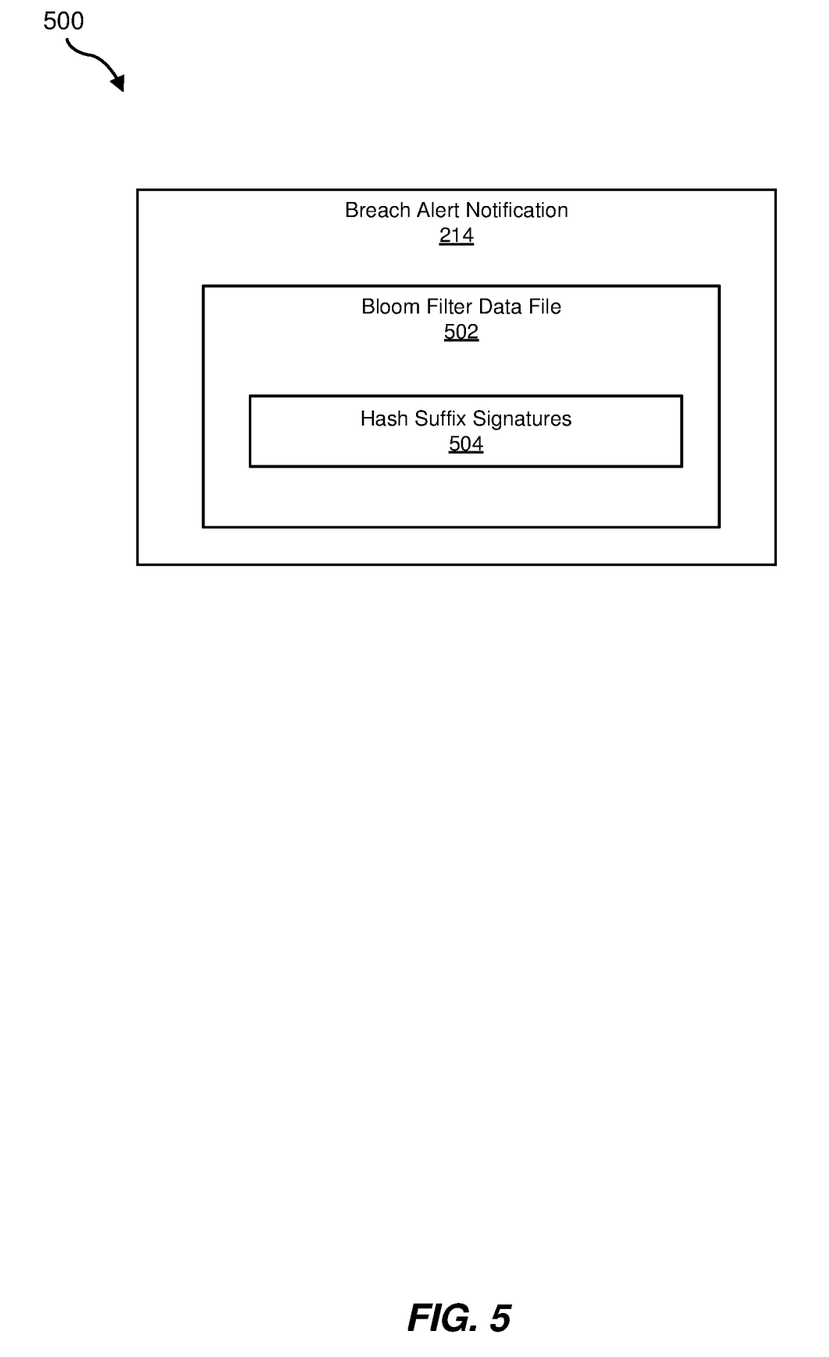
FIG. 5 is a block diagram of an example breach alert notification, including a bloom filter data file, that may be generated by an example system for password breach monitoring and notification.

Sending module 110 may send hash prefix 126 to backend server 206 in a variety of ways. In some embodiments, sending module 110 may send hash prefix 126 with a notification token and a version number associated with hash prefix 126 as data to backend server 206. For example, as shown in FIG. 4, hash prefix send data 402 (for sending to backend server 206) may include hash prefix 126, a notification token 404, and a version number 406. In some examples, notification token 404 may be an APPLE Push Notification (APN) service token. In other examples, notification token 404 may be a FIREBASE Cloud Messaging (FCM) token. Other means of notification may also be utilized as notification token 404. In some examples, version number 406 may be initially set to 0 upon an initial communication of hash prefix send data 402 to backend server 206.

Returning now to FIG. 3, at step 310, one or more of the systems described herein may determine that a breach has occurred based on the password associated with the authentication credentials being compromised when the hash prefix matches a hash suffix. For example, determining module 112 may, as part of client computing device 202 in FIG. 2, determine that hash prefix 126 matches a hash suffix 210 stored on backend server 206 (i.e., determine hash prefix/suffix match 212).

Determining module 112 may determine generate hash prefix/suffix match 212 in a variety of ways. In some embodiments, determining module 112 may receive a push notification including a bloom filter data file representing a set of signatures including the set of hash suffixes and then determine that hash prefix 126 matches a hash suffix 210 when the hash prefix 126 matches a signature from the set of signatures. For example, as shown in FIG. 4, a push notification (e.g., breach alert notification 214) may include a bloom filter data file 502 and a set of hash suffix signatures 504. In some examples, bloom filter data file 502 may represent matching signatures that may be sent by a web service (e.g., backend server 206) sent to client computing device 202. In one example, bloom filter data file 502 may be pre-built or dynamically build. In some embodiments, bloom filter data file 502 may include a reference to a matched prefix (e.g., hash prefix 126), the number of underlying items in the dataset representing hash prefix 126 (which may be referred to as a variable "n") and the number of hash functions used to build the bloom filter (which may be referred to as a variable "k"). Given the variables "n" and "k" in bloom filter data file 502, a user of client computing device 202 may determine whether a hash suffix signature 504 is present in the dataset. In some examples, the bloom filters referred to herein may be built using a pre-defined false positive rate with no false negatives occurring. In one example, for a set of signatures matching a prefix "aaaaa," the associated web service may build a bloom filter with 478 items (n=478), 13 hash functions (k−13) and a false positive rate of 1 in 1,000 such that a resulting bloom filter data file 502 will only consist of 859 bytes. In some examples, for push notification services imposing a size limit on data payloads, the false positive rate for bloom filter data file 502 may be configured such that it fits within the size limit of the aforementioned data payloads.

Returning now to step 310 of FIG. 3, in some examples, determining module 112 may further verify, with backend server 206, that hash prefix/suffix match 212 is not a false positive. In some examples, a false positive may be verified when a user of client computing device 202 submits a query with a higher false positive rate than a bloom filter (e.g., bloom filter data file 502) that was included in a push notification (e.g., breach alert notification 214). Alternatively, a user of client computing device 202 may issue queries using a prefix+nonce+challenge scheme. Alternatively, backend server 206 may assign a version number to bloom filter data file 502 so that only matching signatures that the user of client computing device 202 has not previously checked are included in breach alert notification 214.

In some embodiments, determining module 112 may alternatively generate hash prefix/suffix match 212 by receiving a data container including hash suffixes 210 and a version number for the data container. Determining module 112 may then determine hash prefix/suffix match 212 when hash prefix 126 matches a hash suffix 210 in the data container. For example, as shown in FIG. 4, a data container 408 is shown that includes hash suffixes 210 and a version number 410. In some examples, data container 408 may be a bucket based on hash prefix 126.

Returning now to FIG. 3, at step 312, one or more of the systems described herein may perform a security action that protects against an additional breach associated with the compromised password determined at step 310. For example, security module 114 may, as part of client computing device 202 in FIG. 2, perform a security action that protects against an additional breach associated with a compromised password 208.

Security module 114 may perform the security action in in a variety of ways. In some embodiments, security module 114 may send breach alert notification 214 to a user of client computing device 202 and then generate a request for the user to change password 122 (associated with authentication credentials 116) to a new password. In response to receiving the new password, security module 114 may then generate a new hash prefix for the new password and register the new hash prefix with backend server 206. In some examples, a client SDK may be utilized to register the new hash prefix with backend server 206 with an updated version number (e.g., from version 0 to version 1.0). In some examples, upon receiving the new hash prefix, backend server 206 may be configured to send a new prefix bucket or bloom filter representation of the bucket via a notification payload to client computing device 202 or, alternatively, inform the client SDK that there exists a new bucket for the prefix. Then, client computing device 202 may pull the new buckets and verify whether or not the new password has been compromised.

As explained in connection with method 300 above, the systems and methods described herein provide a breach monitoring service using prefixes such that a service provider never obtains any knowledge of an authentication credential pair (i.e., a username/password pair). In particular, the systems disclosed herein may provide a security application for integration with a client SDK. The client SDK may be utilized by the system to provide username/password pairs. The SDK may then be utilized to perform a one-way hash. The SDK may then be utilized to pick a small prefix from the hash and send the data to a backend service along with a notification token and a version number. At the backend service, the systems disclosed herein may breakdown compromised password data into buckets based on a prefix. Each bucket may contain all of a number of password hash suffixes that match the prefix. In a first call from the SKF, a prefix bucket or a bloom filter may be returned that allows a client to decide whether or not a password has been compromised along with the version of the bucket. If it is determined that the password has been compromised, the client may choose to alert an affected user and have them change the password. The systems disclosed herein may further utilize the SDK (in conjunction with an endpoint client application) to register a new password prefix (or the old password prefix if the password has not been compromised) with the backend service for monitoring with an updated version number. Should there be a new breach, the system disclosed herein may collect the breached data, hash the passwords and update the prefix buckets on the backend service. Upon detecting that one of the prefix buckets has been updated, the systems disclosed herein may send a notification payload or simply inform the SDK that there exists a new bucket for the prefix. The client endpoint application may then pull the new buckets and verify whether or not the new password has been compromised.

Figure 6:
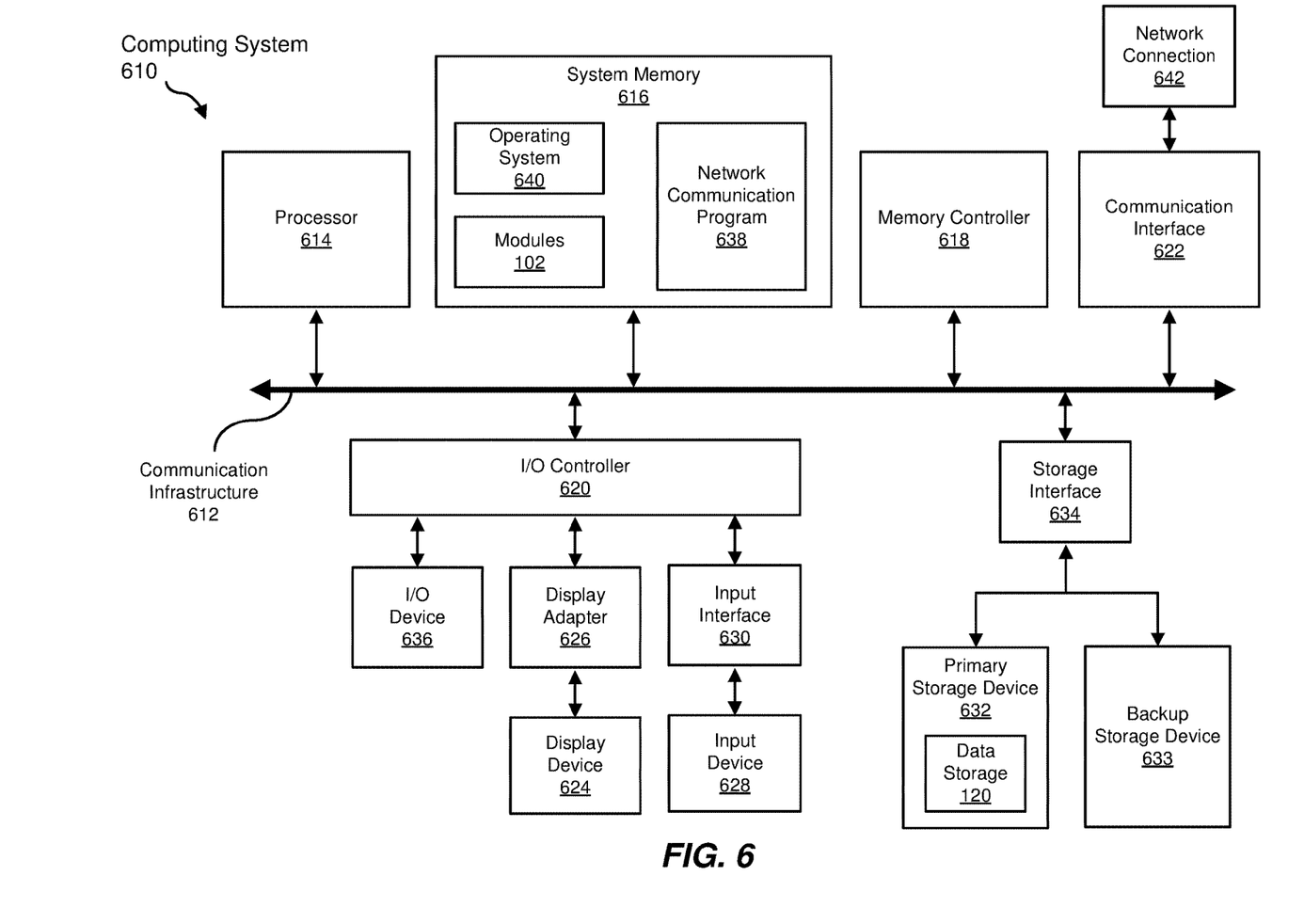
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
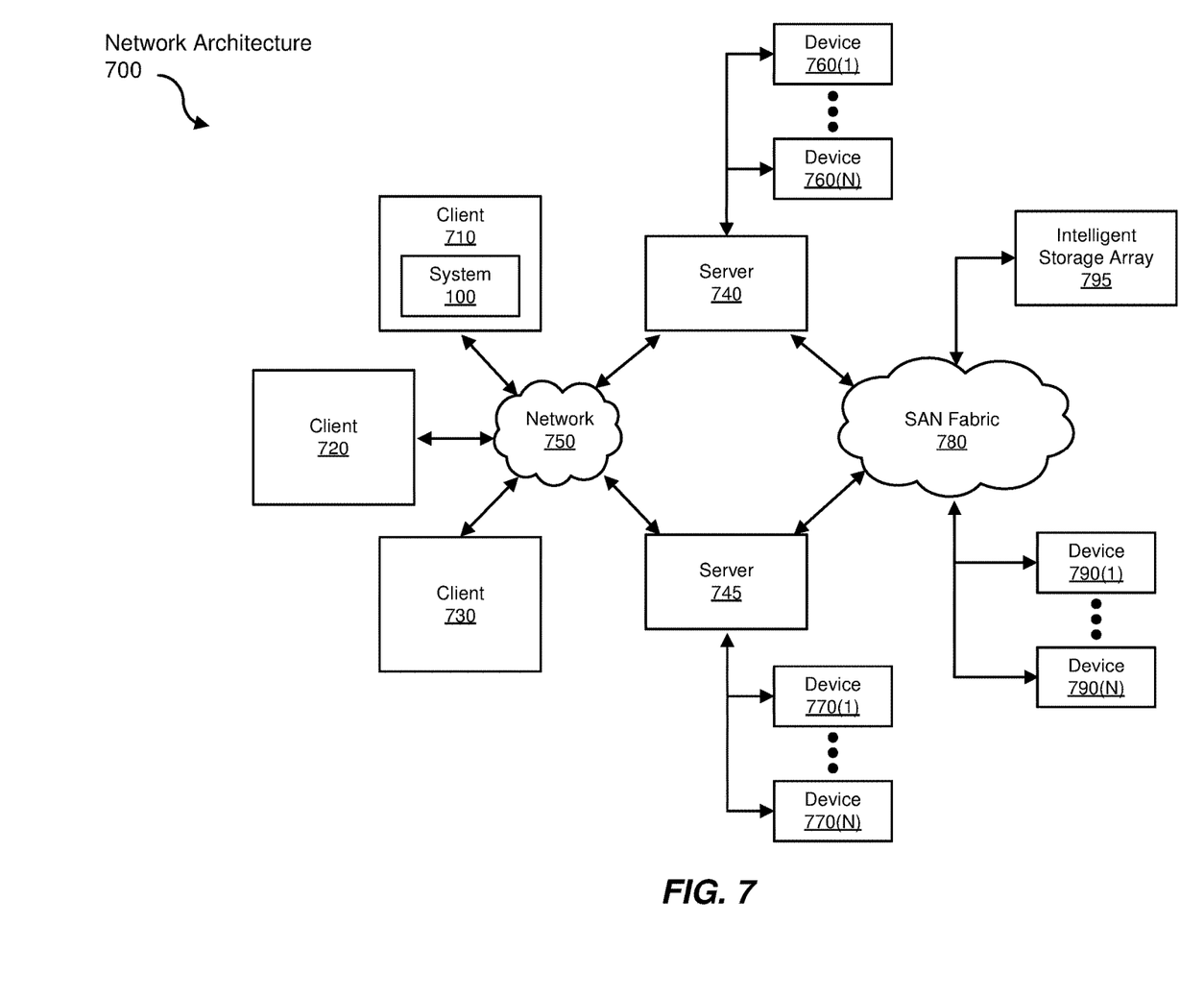
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for password breach monitoring and notification.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for password breach monitoring and notification, at least a portion of the method being performed by one or more computing devices comprising at least one processor, the method comprising:
   detecting, by the one or more computing devices, authentication credentials for a user;
   generating, by the one or more computing devices, a one-way hash for a password associated with the authentication credentials;
   selecting, by the one or more computing devices, a hash prefix comprising a subset of data in the hash;
   sending, by the one or more computing devices, the hash prefix to a backend service for matching with a set of hash suffixes associated with known compromised passwords;
   determining, by the one or more computing devices, that a breach has occurred based on the password associated with the authentication credentials being compromised when the hash prefix matches a hash suffix in the set of hash suffixes; and
   performing, by the one or more computing devices, a security action that protects against an additional breach associated with the compromised password.

2. The computer-implemented method of claim 1, wherein sending the hash prefix to the backend service comprises sending the subset of the hash data, a notification token, and a version number associated with the hash prefix to the backend service.

3. The computer-implemented method of claim 1, wherein determining that the breach has occurred based on the password associated with the authentication credentials being compromised when the hash prefix matches the hash suffix in the set of hash suffixes, comprises:
   receiving, from the backend service, a push notification comprising a bloom filter data file representing a set of signatures comprising the set of hash suffixes; and
   determining that the hash prefix matches the hash suffix when the hash prefix matches a signature from the set of signatures.

4. The computer-implemented method of claim 3, further comprising verifying, with the backend service, that the match of the hash prefix with the hash suffix is not a false positive.

5. The computer-implemented method of claim 1, wherein determining that the breach has occurred based on the password associated with the authentication credentials being compromised when the hash prefix matches the hash suffix in the set of hash suffixes, comprises:
   receiving, from the backend service, a data container comprising the set of hash suffixes and version number for the data container; and
   determining that the hash prefix matches the hash suffix when the hash prefix matches a hash suffix in the data container comprising the set of hash suffixes.

6. The computer-implemented method of claim 1, wherein performing the security action comprises:
   sending a breach alert notification to the user; and
   generating a request for the user to change the password associated with the authentication credentials to a new password.

7. The computer-implemented method of claim 6, further comprising:
   generating a new hash prefix for the new password; and
   registering the new hash prefix with the backend service.

8. The computer-implemented method of claim 1, wherein the one-way hash for the password associated with the authentication credentials further comprises a username associated with the password.

9. A system for password breach monitoring and notification, the system comprising:
   at least one physical processor;
   physical memory comprising computer-executable instructions and one or more modules that, when executed by the physical processor, cause the physical processor to:
      detect, by a detection module, authentication credentials for a user;
      generate, by a hash module, a one-way hash for a password associated with the authentication credentials;
      select, by a selection module, a hash prefix comprising a subset of data in the hash;
      send, by a sending module, the hash prefix to a backend service for matching with a set of hash suffixes associated with known compromised passwords;
      determine, a determining module, that a breach has occurred based on the password associated with the authentication credentials being compromised when the hash prefix matches a hash suffix in the set of hash suffixes; and
      perform, by a security module, a security action that protects against an additional breach associated with the compromised password.

10. The system of claim 9, wherein the sending module sends the hash prefix to the backend service by sending the subset of the hash data, a notification token, and a version number associated with the hash prefix to the backend service.

11. The system of claim 9, wherein the determining module determines that the breach has occurred based on the password associated with the authentication credentials being compromised when the hash prefix matches the hash suffix in the set of hash suffixes, by:
   receiving, from the backend service, a push notification comprising a bloom filter data file representing a set of signatures comprising the set of hash suffixes; and
   determining that the hash prefix matches the hash suffix when the hash prefix matches a signature from the set of signatures.

12. The system of claim 11, wherein the determining module further verifies, with the backend service, that the match of the hash prefix with the hash suffix is not a false positive.

13. The system of claim 9, wherein the determining module determines that the breach has occurred based on the password associated with the authentication credentials being compromised when the hash prefix matches the hash suffix in the set of hash suffixes, by:
   receiving, from the backend service, a data container comprising the set of hash suffixes and version number for the data container; and
   determining that the hash prefix matches the hash suffix when the hash prefix matches a hash suffix in the data container comprising the set of hash suffixes.

14. The system of claim 9, wherein the security module performs the security action by:
   sending a breach alert notification to the user; and
   generating a request for the user to change the password associated with the authentication credentials to a new password.

15. The system of claim 14, further registers a new hash prefix generated for the new password with the backend service.

16. The system of claim 14, wherein the one-way hash for the password associated with the authentication credentials further comprises a username associated with the password.

17. A non-transitory computer-readable medium comprising one or more computer-executable instructions that, when executed by at least one processor of a computing device, cause the computing device to:
- detect authentication credentials for a user;
- generate a one-way hash for a password associated with the authentication credentials;
- select a hash prefix comprising a subset of data in the hash;
- send the hash prefix to a backend service for matching with a set of hash suffixes associated with known compromised passwords;
- determine that a breach has occurred based on the password associated with the authentication credentials being compromised when the hash prefix matches a hash suffix in the set of hash suffixes; and
- perform a security action that protects against an additional breach associated with the compromised password.

18. The non-transitory computer-readable medium of claim 17, wherein the one or computer-executable instructions cause the computing device to send the hash prefix to the backend service by sending the subset of the hash data, a notification token, and a version number associated with the hash prefix to the backend service.

19. The non-transitory computer-readable medium of claim 17, wherein the one or computer-executable instructions cause the computing device to determine that the breach has occurred based on the password associated with the authentication credentials being compromised when the hash prefix matches the hash suffix in the set of hash suffixes, by:
- receiving, from the backend service, a push notification comprising a bloom filter data file representing a set of signatures comprising the set of hash suffixes; and
- determining that the hash prefix matches the hash suffix when the hash prefix matches a signature from the set of signatures.

20. The non-transitory computer-readable medium of claim 19, wherein the one or computer-executable instructions further cause the computing device to verify, with the backend service, that the match of the hash prefix with the hash suffix is not a false positive.

* * * * *